Figure 1:
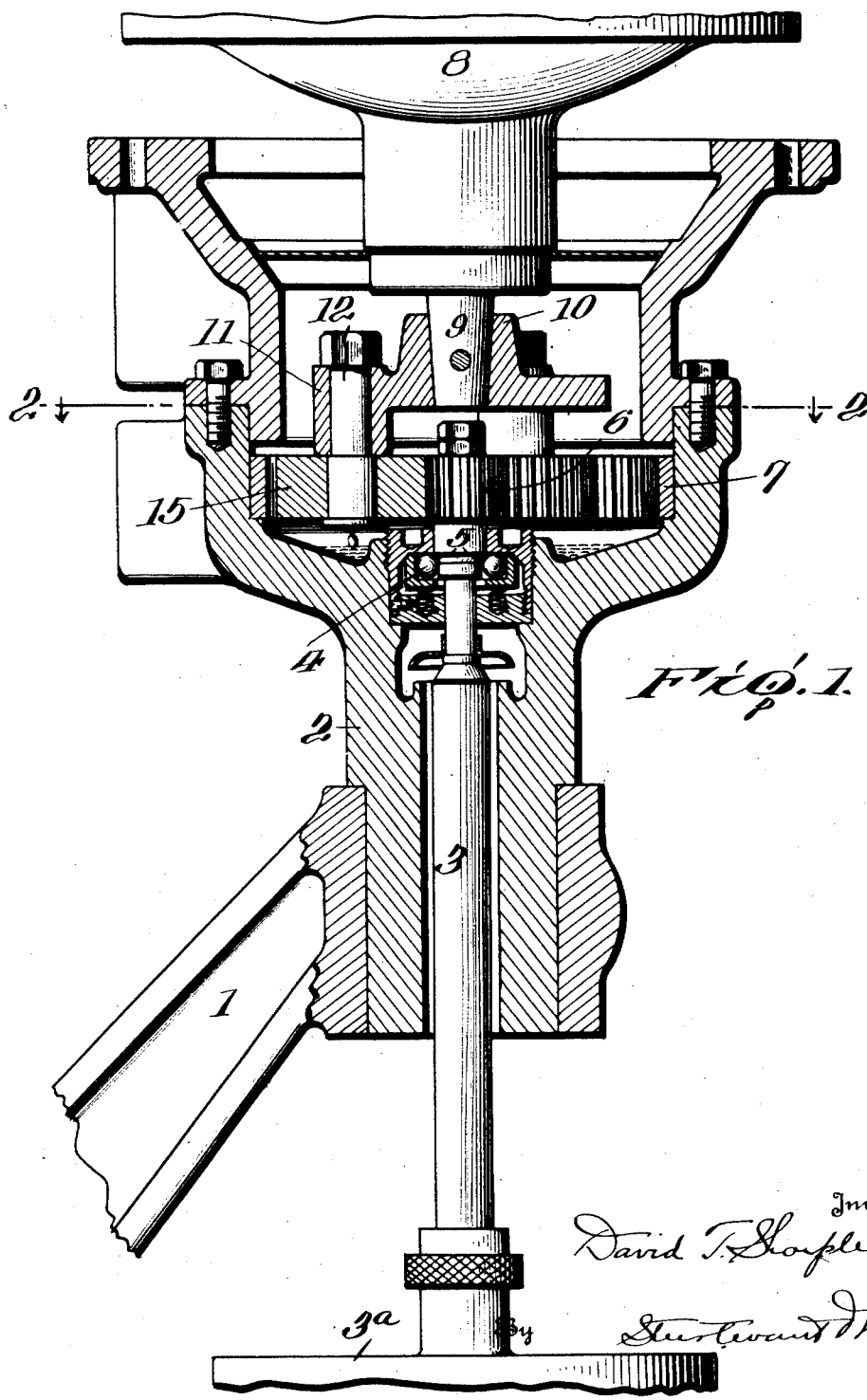

April 23, 1929.  D. T. SHARPLES  1,710,593
CENTRIFUGAL CREAM SEPARATOR
Filed April 16, 1927    2 Sheets-Sheet 2

Patented Apr. 23, 1929.

1,710,593

UNITED STATES PATENT OFFICE.

DAVID T. SHARPLES, OF WEST CHESTER, PENNSYLVANIA, ASSIGNOR TO THE SHARPLES SEPARATOR COMPANY, OF WEST CHESTER, PENNSYLVANIA, A CORPORATION OF PENNSYLVANIA.

CENTRIFUGAL CREAM SEPARATOR.

Application filed April 16, 1927. Serial No. 184,258.

The invention relates to new and useful improvements in cream separators, and centrifugal machines, and more particularly to the actuating mechanism therefor. It has been a common expedient to use a hanging or suspended bowl rotated at very high speed for centrifugal separating purposes.

An object of the present invention is to provide a driving mechanism for such a type of bowl, which driving mechanism is so constructed and arranged as to create no unbalanced side thrust whatever on the suspended bowl and spindle carrying the same while in operation.

In the drawings which show by way of illustration one embodiment of the invention—

Figure 2:
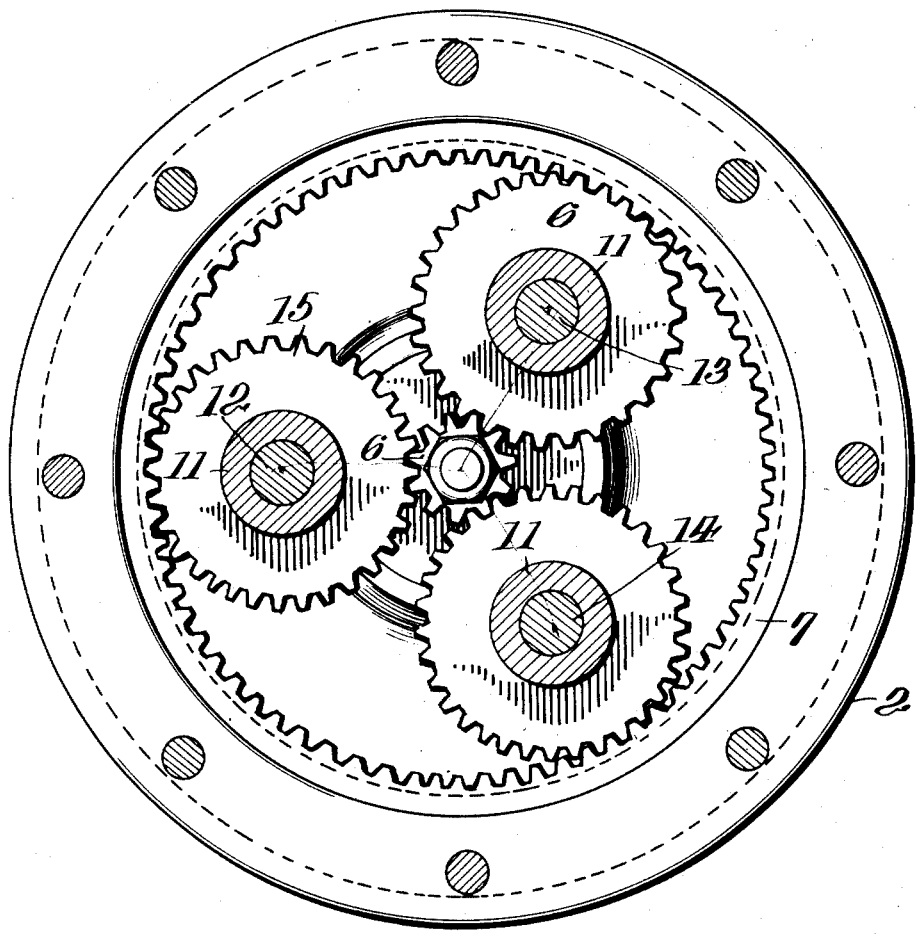

Figure 1 is a view in vertical section showing a portion of a cream separator having the improvement applied thereto, and Fig. 2 is a sectional view on the line 2—2 of Fig. 1.

The invention is directed to a driving mechanism for a separator bowl. It is a common practice to suspend the separator bowl by a driving spindle, and to provide a drag bush for guiding the lower end of the bowl in its rotation. This drag bush fits loosely on the boss carried by the bowl, and is usually supported so that it may have a limited retarded lateral movement. This enables the bowl when it is rotated at high speed to center itself. The bowl is rotated by a driving connection with the spindle which supports it. If the flexible spindle is rotated by a pinion at one side thereof, rotating about a fixed center, or by a worm, the driving thrust or pressure is liable to force the bowl to one side and out of plumb. The purpose of the present invention is to provide a driving mechanism wherein the driving pressure or thrust is distributed about the spindle. This is accomplished by using a planetary gear for driving the spindle, wherein the ring gear is concentric with the spindle, and held stationary. The sun gear is fixed to and centered on the spindle, while the planetary gears, a plurality of which are preferably used, are disposed between the sun gear and ring gear and travel bodily about the spindle, thus constantly shifting the point of driving pressure and also distributing the driving pressure about the spindle.

Referring more in detail to the drawings, I have shown a portion of a cream separator which consists of an outer jacket or framework 1 carrying a head 2, in which is mounted a spindle 3. The separator bowl 3ª is rigidly supported by the lower end of this spindle, and at the lower end of the bowl, is the usual drag bush. It is not thought necessary to show in detail the bowl and its drag bush, as the invention is directed entirely to the driving mechanism for the spindle with this type of cream separator, which is the well-known type of cream separator. Mounted in the head 2 is a ball bearing 4. The spindle 3 has a tapered shoulder 5 which rests on the ball bearing. This spindle is capable of a slight lateral movement with the ball cup and the supporting balls, so that it may center itself when rotating at high speed. This enables the suspended bowl to center itself and rotate about a fixed axial line passing through its center of gravity. It is possible that the spindle might be made flexible so that the bowl could center itself when rotated rapidly through the flexing of the spindle itself. It is essential, however, that the spindle shall be so constructed or supported as to permit the centering of the bowl during rotation thereof, and for the purpose of description, I will refer to such a construction as a flexible spindle.

Mounted on the spindle and centered relative thereto is a sun gear 6. Mounted in the head 2 and concentric with the spindle is a ring gear 7. Directly above the head of the machine is a motor 8 provided with a driving shaft 9. The driving shaft 9 of the motor is axially in alinement with the axis of the spindle. Rigidly mounted on the shaft 9 is a hub 10 carrying a spider 11. This spider 11 is provided, in the present embodiment of the invention, with three stub shafts 12, 13 and 14. Each stub shaft carries a pinion or gear 15. This pinion or gear 15 has its teeth of the same pitch as the gear teeth in the ring gear 7, and also of the same pitch as the gear teeth in the sun gear 6. This is a planetary gear, and during the actuation of the spindle, the planet gears 15 travel bodily about the axis of the spindle as a center. They are preferably of such a size relative to the sun gear as to greatly increase the speed of the spindle over that of the speed of the driving shaft of the motor.

It will be noted that the angles between the driving gears are substantially equal, and therefore, the driving pressure or lateral strain of the driving gears are substantially counterbalanced one by the others. That is, the driving pressure is distributed about the spindle. Furthermore, the point of driving pressure, that is, where the gears mesh, is bodily traveling about the spindle. The spindle of a cream separator is often rotated at a speed of twelve thousand rotations per minute, and it will be readily seen that if only one planet gear is used, it will travel about the spindle at a rate of something like twenty-eight times per second. This alone would distribute the driving pressure on the spindle and make a balanced drive as the point where the pressure is applied traveling so rapidly about the spindle, would keep the spindle properly centered. In order, however, that the driving pressure from the very starting of the spindle may be properly balanced, I prefer to use a plurality of planet gears so disposed that the driving pressure of one is balanced by the others.

From the above it will be apparent that the improvement consists in the actuating mechanism for a flexible spindle supporting and rotating a separator bowl at a very high speed, wherein the driving mechanism is so constructed and arranged that the driving pressure on the spindle exerts no unbalanced side thrust on the suspended bowl and flexible spindle. This result is accomplished by the use of a planetary gear centered relative to the driving spindle for actuating the same.

Having thus described the invention, what I claim as new and desire to secure by Letters-Patent, is—

1. The combination of a separator bowl, a flexible spindle for suspending and rotating said bowl, and a planetary actuating gear for the spindle disposed with the ring gear and sun gear concentric to the axis of the spindle and with the sun gear attached thereto, whereby the planet gear will travel bodily about the spindle and continuously shift the point of driving pressure so that at high speed, there is little or no side thrust on the spindle.

2. The combination of a separator bowl, a flexible spindle for suspending and rotating said bowl, and an actuating planet gear for the spindle having a plurality of planet gears disposed about the spindle so as to distribute the driving pressure around the same, and having a sun gear and ring gear concentric to the axis of the spindle with the sun gear attached thereto.

In testimony whereof, I affix my signature.

DAVID T. SHARPLES.